United States Patent [19]

Amemori et al.

[11] 4,242,916
[45] Jan. 6, 1981

[54] TURBINE METER

[75] Inventors: Hiroyuki Amemori, Kawasaki; Shigeru Nishiyama, Ninomiya, both of Japan

[73] Assignee: Tokico Ltd., Kanagawa, Japan

[21] Appl. No.: 29,009

[22] Filed: Apr. 11, 1979

[30] Foreign Application Priority Data

Apr. 20, 1978 [JP] Japan ............................ 53-47088

[51] Int. Cl.³ .............................................. G01F 1/12
[52] U.S. Cl. ................................................ 73/861.83
[58] Field of Search ............................ 73/230, 231 R

[56] References Cited

U.S. PATENT DOCUMENTS 3,757,578  9/1973  Clinton ............................ 73/231 R
4,155,253  5/1979  Kato et al. ........................ 73/231 R Primary Examiner—Charles A. Ruehl
Attorney, Agent, or Firm—Stevens, Davis, Miller & Mosher

[57] ABSTRACT

A turbine meter for measuring flow rates of various fluids of different coefficients of viscosity. The turbine meter has an impeller including a cylindrical body and a plurality of vanes provided on the outer peripheral surface of the cylindrical body, a tube in which the impeller is rotatably supported, guide members disposed at the upstream side and downstream side of the impeller and adapted for guiding flow of fluid passing through the impeller, and means for permitting the adjustment of the axial distance between two cone members from the outside of the turbine meter.

7 Claims, 4 Drawing Figures

TURBINE METER

BACKGROUND OF THE INVENTION

The present invention relates to a turbine meter for use in measurement of flow rate of fluids and, more particularly, to a turbine meter which can measure the flow rates of various fluids having relatively high viscosities, with a function of adjusting the regions of allowable measurement error for various fluids having different viscosities, i.e. a function to optimize the measurable regions for respective fluids.

A turbine meter has been known having a tube and an impeller rotatably disposed in the tube, the impeller being adapted to be rotated at a speed proportional to the flow velocity of the fluid.

In this type of turbine meter, there is a relation expressed by the following equation (1), between the flow rate Q of the fluid and the angular velocity $\omega$ of the impeller.

$$\frac{\omega}{Q} = \frac{\tan\alpha}{rA} - \frac{Tf}{r^2\rho Q^2} - \frac{Tm}{r^2\rho Q^2} \quad (1)$$

where, $\alpha$: angle of impeller vane to axis of tube,
r: mean radius of vane,
A: area of annular passage defined by inner and outer peripheries of vane,
Tf: resistance torque of impeller caused by viscosity of fluid against rotation by fluid,
Tm: resistance torque of impeller caused by mechanical resistance against rotation by fluid,
$\rho$: density of fluid In this equation, the term of resistance torque Tm due to the mechanical resistance is negligibly small as compared with the term of resistance torque Tf due to the viscosity resistance.

Thus, the equation (1) can be rewritten without substantial error, as following equation (1').

$$\frac{\omega}{Q} = \frac{\tan\alpha}{rA} - \frac{Tf}{r^2\rho Q^2} \quad (1')$$

Representing the viscosity coefficient of the fluid by $\mu$, the above-mentioned resistance torque Tf is given as follows, depending on the states of flow of the fluid.

$$Tf\alpha \begin{cases} \rho^{\frac{1}{2}}\mu^{\frac{1}{2}}Q^{3/2} & \text{(in case of laminar flow)} \quad (2) \\ \rho Q^2 - K\mu Q & \text{(in case of flow intermediate between laminar and turbulent flow)} \quad (3) \\ \rho Q^2 & \text{(in case of turbulent flow)} \quad (4) \end{cases}$$

Therefore, the ratio of angular velocity to flow rate $\omega/Q$ are represented, respectively, by the following equations (5), (6) and (7), depending on the states of flow.

$$\frac{\omega}{Q} = \begin{cases} \frac{\tan\alpha}{rA} - K_1\sqrt{\frac{\mu}{\rho Q}} & \text{(in case of laminar flow)} \quad (5) \\ \frac{\tan\alpha}{rA} - K_2 + K_3\frac{\mu}{Q} & \text{(in case of intermediate state between laminar and turbulent flow)} \quad (6) \\ \frac{\tan\alpha}{rA} - K_2 & \text{(in case of turbulent flow)} \quad (7) \end{cases}$$

In these equations, $K_1$, $K_2$ and $K_3$ represent, respectively, different constants.

As will be understood from these equations, in case of a turbulent flow, i.e. in the region represented by equation (7), the ratio $\omega/Q$ is a constant which is independent of the flow rate Q. This means that the angular velocity $\omega$ of the impeller is proportional to the flow rate Q. It is therefore possible to measure the flow rate accurately, by multiplying the measured angular velocity $\omega$ by the proportional constant. On the other hand, in case of the laminar flow and the intermediate state of flow, the ratio $\omega/Q$ cannot be independent of the flow rate Q, so that the flow rate Q is not proportional to the angular velocity $\omega$. Thus, it is impossible to accurately measure the flow rate, unless a suitable correction is made.

In case of measurement of the flow rate of a relatively low viscosity, the flow of fluid assumes a state of turbulent flow from a relatively low region of flow rate, so that the constant flow rate is obtained even at the low region of flow rate. This means that an accurate measurement of the flow rate can be achieved over a wide range of flow rate.

In contrast to the above, in case of fluids having relatively high viscosities, the state of laminar flow is maintained until the flow rate is increased to a comparatively high level, causing a change of the ratio $\omega/Q$. Therefore, in case of fluids having relatively high viscosities, the accurate measurement is achieved only over a limited range of flow rate.

Therefore, the conventional turbine meter, which can measure the flow rate of fluids of relatively less viscous fluids such as gasoline, water and the like considerably accurately, cannot provide satisfactorily accurately the flow rate of relatively viscous fluid such as heavy oil or the like over a wide range of flow rate, particularly at a region of relatively small flow rate, unless a suitable measure is taken.

On the other hand, such a measurement system is conceivable as having means for making a non-linear processing of the signal produced by the turbine meter so as to materially make the ratio $\omega/Q$ constant over a wide range of flow rate including region of relatively small flow rate. Such a measurement system is effective if it is intended for use in measurement of flow rate of only one kind of fluid, but it is disadvantageous in that it requires revision of content of the non-linear processing in accordance with the viscosities of the fluids, when it is used for a plurality of different fluids.

SUMMARY OF THE INVENTION

It is therefore a major object of the invention to provide a turbine meter capable of widening or spreading the range of flow rate over which the measurement can be made accurately, in the measurement of flow rate of fluid having a high coefficient of viscosity.

It is another object of the invention to provide a turbine meter which affords an easy adjustment for setting the optimum range of flow rate for each of a plurality of different fluids.

It is still another object of the invention to provide a general-purpose turbine meter which can be used for measuring the flow rate of fluids of a large variety of viscosities, including fluids of relatively small coefficient of viscosity and fluids of relatively large coefficient of viscosity.

To these ends, according to the invention, there is provided a turbine meter comprising a tube, an impeller having a cylindrical body and a plurality of vanes provided on the outer peripheral surface of the cylindrical body, the impeller being rotatably supported in the tube, members for guiding the flow of fluid and provided on the upstream and downstream ends of the impeller, and means for permitting an adjustment of the axial distance between the two members from the outside of the turbine meter.

In the turbine meter of the invention having above stated features, the state of flow of the fluid or the viscosity resistance generated at the impeller can be adjusted by changing the distance between two guide members, so that the range of accurate measurement can be widened even for fluids having relatively high viscosities. In addition, since this distance is adjustable from the outside of the turbine meter, a single turbine meter can be used for the measurement of flow rates of a plurality of fluids having different coefficients of viscosity.

These and other objects, as well as advantageous features of the invention will become more clear from the following description of the preferred embodiments taken in conjunction with the accompanying drawings.

DESCRIPTION OF THE PREFERRED EMBODIMENTS

Figure 1:
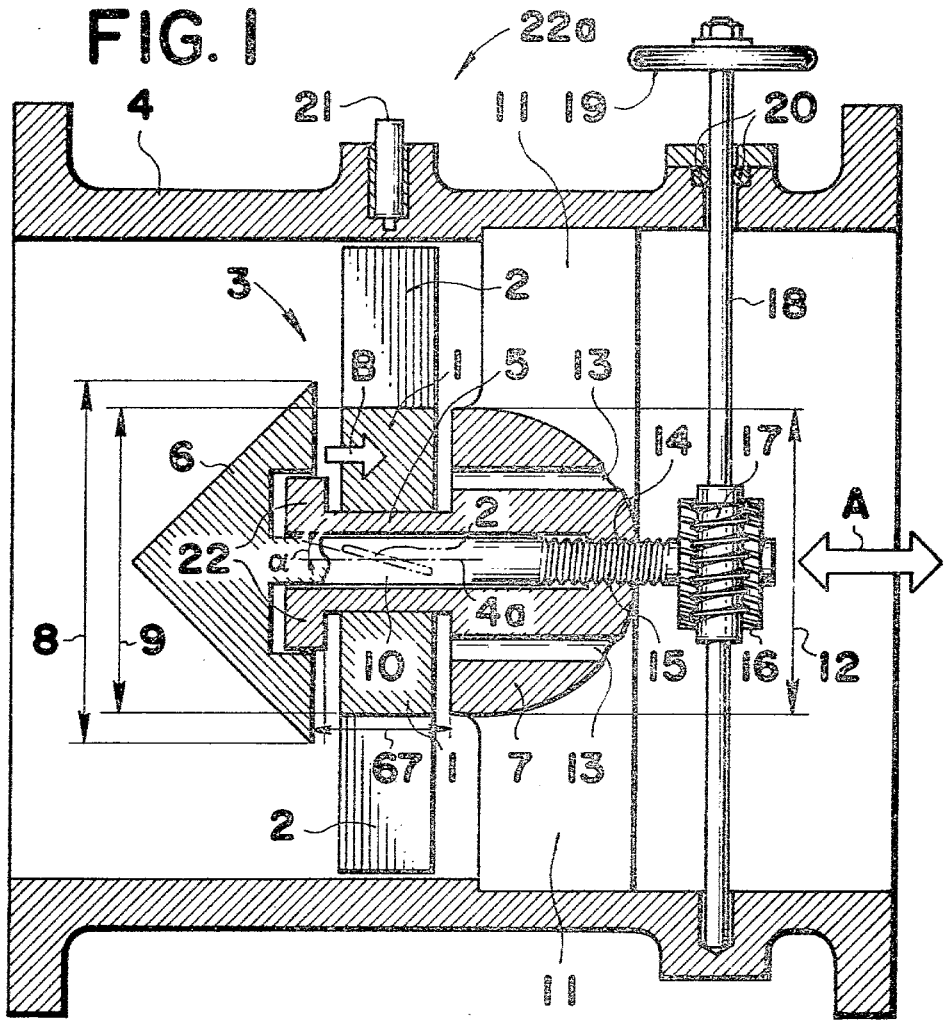
FIG. 1 is a sectional view of a preferred embodiment of the invention.

Referring first to FIG. 1, a turbine meter constructed in accordance with the first embodiment of the invention has a cylindrical body 1 on the outer peripheral surface of which provided are a plurality of vanes 2. The cylindrical body 1 and the vanes 2 in combination constitute an impeller 3 which is rotatably supported in a tube 4 as a casing, by a cylindrical stationary shaft 5, through the medium of a journal, bush and so on. Each vane 2 is inclined at an angle $\alpha°$ to the axis 4a of the tube 4. A conical shaped member 6 provided at the upstream side of the impeller 3 is adapted to cooperate with another member 7 provided at the downstream side of the impeller 3 in guiding the flow of the fluid flowing through the impeller 3. The maximum diameter portion 8 of the guide member 6 has a diameter larger than the outer diameter 9 of the cylindrical member 1. A movable shaft 10 extending through the hollow spaces of the stationary shaft 5 and the guide member 7 is connected at its one end to the member 6. The guide member 7 extended from the stationary shaft 5 has a hemispherical shape, and is suspended by a plate shaped supporting member 11 fixed at both ends by the wall of the tube 4, and is placed substantially at the center of the tube 4.

The impeller 3 is prevented from moving in the axial direction (directions of an arrow A) by the member 7 and an annular flange 22 which extends radially outwardly from the stationary shaft 5. The maximum diameter portion 12 of the member 7 has a diameter equal to the outer diameter of the cylindrical body 1. The member 7 is provided with through bores 13. A static pressure caused by the fluid flowing through these through bores 13 acts on the downstream side end surface of the cylindrical body 1, so as to allow the impeller 3 to rotate in a floated manner without making any contact with the upstream and downstream guide members 6, 7. The threaded portion 14 in the member 7 through which the movable shaft 10 extends engages a threaded part 15 of the movable shaft 10. Therefore, the movable shaft 10 is moved in the axial direction as it is rotated. A worm wheel 16 provided on the projected end of the movable shaft 10 engages a worm gear 17. The worm gear 17 is carried by a rotary shaft 18 which is supported at its one end by the wall of the tube 4. The other end of the rotary shaft 18 is projected out of the tube 4. A handle wheel 19 is fixed to the projecting end of the rotary shaft 18. As the handle 19 is rotated in one or the other direction, the torque is transmitted to the movable shaft 10, through the wheel 16 and the worm gear 17, so that the movable shaft 10 is rotated. An "O" ring 20 or the like is interposed between the rotary shaft 18 and the tube 4 so as to form therebetween an effective fluid-tight seal.

A pickup coil 21 disposed on the tube 4 and confronting the vanes 2 is adapted to electrically detect the rotation of the impeller 3, through sensing the change in magnetic flux caused by the passage of the vanes 2.

In the turbine meter 22a of the invention having the described construction, the rotary shaft 18 and the worm gear 17 are rotated as the handle 19 is rotated. As a result, the movable shaft 10 is rotated, through the rotation of the worm wheel 16 meshing with the gear 17, so as to be displaced in the axial direction relatively to the stationary shaft 5 and the member 7, by the screwing engagement of the portions 14, 15 with each other. The axial movement of the movable shaft 10 in turn causes an axial movement of the guide member 6 fixed to the movable shaft 10, so that the distance 67 between the members 6, 7 is changed. It is evident that the distance 67 between two members is adjustable from the outside of the turbine meter 22a.

In practical use, this distance 67 between the two guide members 6, 7 is changed and set in accordance with the coefficient of the viscosity of the fluid to be measured, so that the flow of fluid coming from the upstream side and guided by the member 6 toward the impeller 3 is rendered turbulent as it collides with the vanes 2, depending on the distance 67 between the two members 6 and 7.

It is also to be noted that, since the maximum diameter portion 8 of the member 6 has a diameter larger than that of the cylindrical body 1, the fluid around the base portion of the vanes 2 has no substantial velocity component in the direction of the arrow B. Consequently, a laminar flow viscous resistance is imposed on the base portions of the vanes 2.

Provided that this viscous resistance is set to be equal to the term $K\mu Q$ in the foregoing equation (3), the equations (5) to (7) are reformed, respectively, to the following equations (8) to (10).

$$\frac{\omega}{Q} = \begin{cases} \frac{\tan\alpha}{rA} - K_1\sqrt{\frac{\mu}{\rho Q}} - K_3\frac{\mu}{\rho Q} \text{ (laminar flow)} & (8) \\ \frac{\tan\alpha}{rA} - K_2 \text{ (intermediate state of flow)} & (9) \\ \frac{\tan\alpha}{rA} - K_2 - K_3\frac{\mu}{\rho Q} \text{ (turbulent flow)} & (10) \end{cases}$$

The advantage of the described construction of the turbine meter is known from the analysis of the equation (8), (9) and (10). This value $-K_3(\mu/\rho Q)$ is negligibly small in the region of turbulent flow at a large flow rate. The measurement error in the region of turbulent flow can therefore be neglected. In addition, in the intermediate region of intermediate state of flow between the laminar and the turbulent flows, the ratio $\omega/Q$ is rendered materially independent from the value of the flow rate Q. Therefore, this intermediate region is involved in the measurement range.

Figure 2:
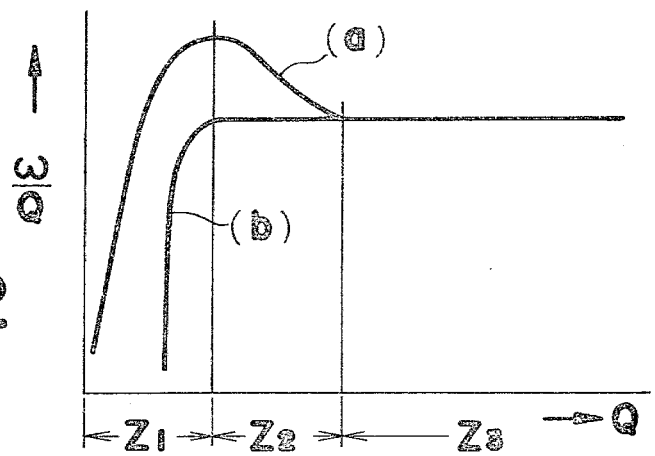
FIG. 2 is a chart showing the relation between the flow rate Q and the ratio $\omega/Q$ of the angular velocity of the impeller of the turbine meter to the flow rate.

FIG. 2 shows the relation between the flow rate Q and the ratio $\omega/Q$. The relations observed in a conventional turbine meter and the turbine meter of the invention are shown, respectively, by the curves (a) and (b). The regions Z1, Z2 and Z3 correspond, respectively, to the region of laminar flow, region of the intermediate flow state and the region of the turbulent flow.

Thus, according to the invention, the state of flow of the fluid is shifted toward the region of turbulent flow or the region of the intermediate flow state. Also, it is possible to impart a desired viscous resistance. It is therefore possible to make a measurement of the flow rate of a plurality of fluids of a large variety of viscosities, including the fluid having relatively low viscosity and the fluid having relatively high viscosity, while maintaining the characteristic of the measuring instrument in good order. A prompt adjustment of the turbine meter for measurement of flow rates of different fluids is possible, if the relation between the coefficients of viscosity of fluids and the displacement of the member 6 (distance between two members 6, 7) has been previously determined for the desired range of measurement. It is also possible to determine the amount of rotation of the handle 19 corresponding to the coefficients of viscosities of different fluids, upon consultation with a scale provided in relation to the handle 19. Further, by arranging such that the handle 19 can be fixed at a predetermined position, a good measuring characteristic is ensured for a plurality of turbine meters fabricated in accordance with the same specification. Also, the turbine meters are rendered easily applicable to different fluids having different coefficients of viscosity.

Figure 3:
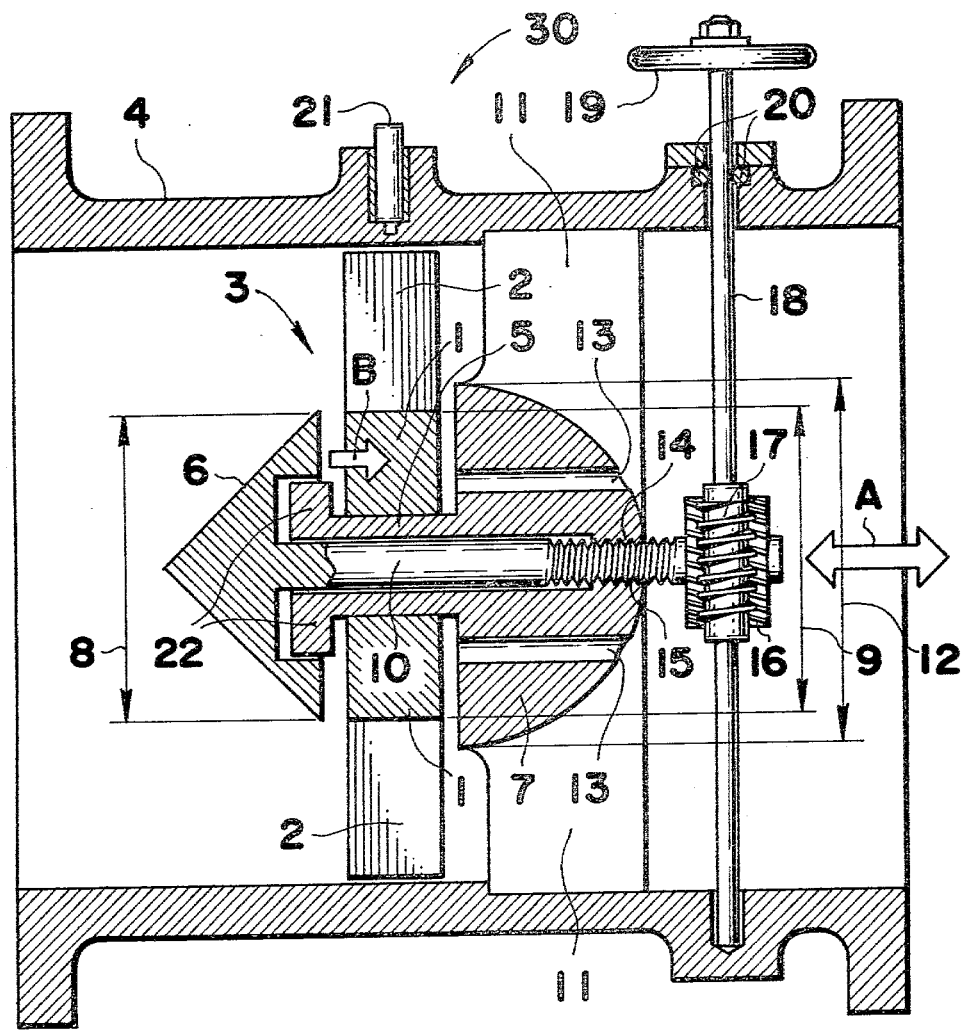
FIG. 3 is a sectional view of another preferred embodiment of the invention.

Referring now to FIG. 3 showing a second embodiment of the invention, the maximum diameter portion 8 of the member 6 has a diameter equal to the outer diameter 9 of the cylindrical body 1, while the maximum diameter portion 12 of the member 7 is made to have a diameter larger than the outer diameter 9 of the cylindrical body 1. In this turbine meter 30, only the viscous resistance caused at the base portion of the impeller 3 is adjusted, by an axial displacement of the member 6 of the upstream side, so as to provide a desired measuring characteristics of the turbine meters for preselected fluids.

Figure 4:
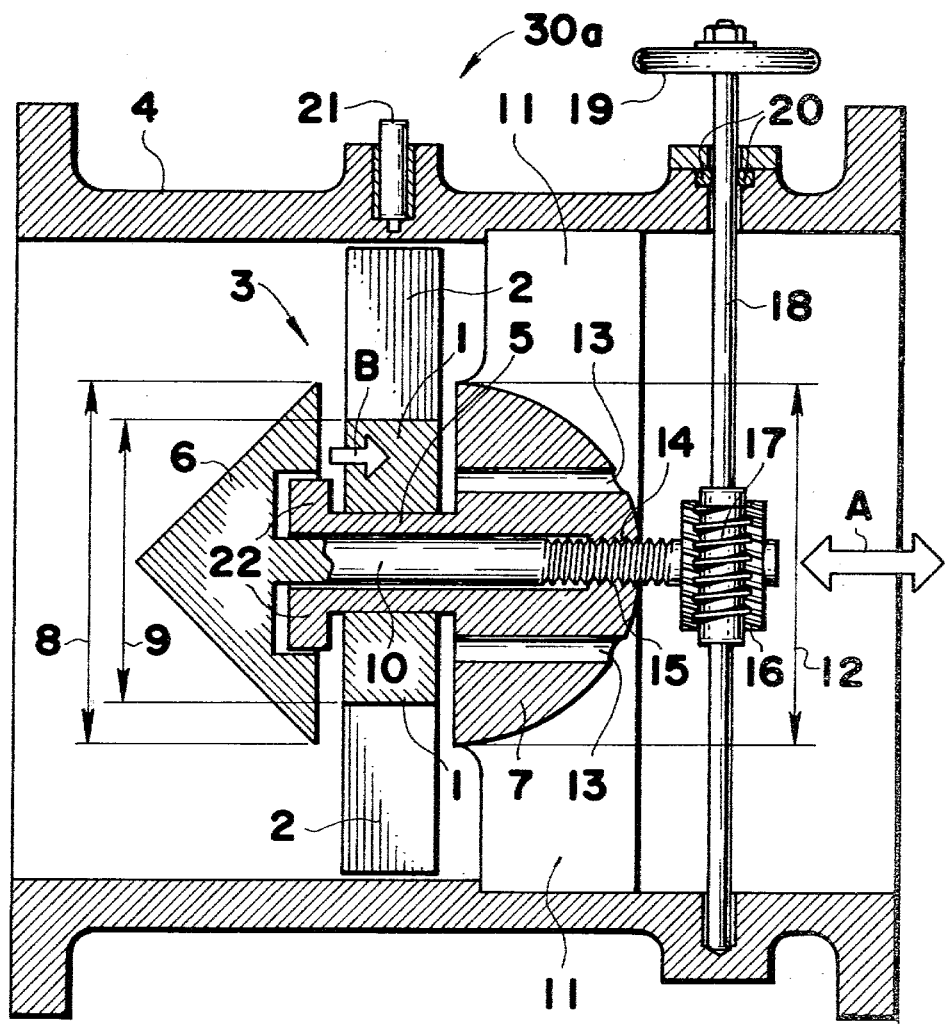
FIG. 4 is a sectional view of still another preferred embodiment of the invention.

FIG. 4 shows still another embodiment of the invention in which the maximum diameter portions 8 and 12 of the members 6 and 7 are made to be greater than the outer diameter 9 of the cylindrical body 1. In this turbine meter 30a, a viscous resistance is beforehand generated at the base portion of the impeller 3, and the state of flow of fluid is shifted to the region of intermediate flow state or to the region of the turbulent flow, and the viscous resistance is also adjusted, through changing the state of flow by displacing the member 6 of the upstream side. This embodiment therefore is suitable particularly in such uses as requiring a fine adjustment.

The maximum diameter portion of either one of the guide members is made to be greater than the outer diameter of the cylindrical body. However, the present invention is not limited to the said embodiment. That is, the said maximum diameter portion is not necessarily made to be greater than the outer diameter of the cylindrical body since the flow of fluid may be reduced by means of the guide member of the upstream side. Further, in the described embodiment, the distance between two guide members are changed by a movement of the member 6 of the upstream side. This arrangement, however, is not exclusive, and the change of the distance between the guide members may be effected by moving the member 7 of the downstream side. Further, the shapes of the upstream side and downstream side guide members, which are described and illustrated to be conical and hemispherical, respectively, may be exchanged. In other words, the upstream side and the downstream side guide members 6, 7 can have, respectively, a hemispherical shape and a conical shape. It is further possible to make the upstream side and downstream side guide members have an equal conical or hemispherical shape.

What is claimed is:

1. A turbine meter comprising: an impeller having a cylindrical body and a plurality of vanes provided on the outer peripheral surface of said cylindrical body; a tube in which said impeller is rotatably supported; members for guiding the flow of a fluid passing through said impeller and disposed at the upstream side and downstream side of said impeller, respectively, at least one of said guide members having a maximum diameter portion greater than the outer diameter of said cylindrical body; and means for permitting an adjustment of the distance between said guide members from the outside of said turbine meter, said means having a movable shaft extending through a stationary shaft fixed to one of said guide members, and members for operating said movable shaft from the outside of said turbine meter, said movable shaft being fixed at one end to the other of said guide members and connected to said members for operating said movable shaft at the other end, and said cylindrical body being rotatably supported on the stationary shaft.

2. A turbine meter as claimed in claim 1, wherein the maximum diameter portion of said guide member of the upstream side has a diameter greater than the outer diameter of said cylindrical body.

3. A turbine meter as claimed in claim 1, wherein the maximum diameter portion of said guide member of the downstream side has a diameter greater than the outer diameter of said cylindrical body.

4. A turbine meter as claimed in claim 1, wherein said guide memebers of the upstream and downstream sides have respective maximum diameter portions of a diameter greater than the outer diameter of said cylindrical body.

5. A turbine meter as claimed in claim 1, wherein said stationary shaft is fixed to said quide member of the downstream side, while said movable shaft is fixed to said guide member of the upstream side, said movable shaft being screwed to said guide member of the downstream side and connected to said members for operating said movable shaft through an engagement of a worm gear and a worm wheel.

6. A turbine meter as claimed in claim 1, wherein said guide member of the downstream side is provided with through bores, whereby a static pressure is applied to said impeller so as to allow the latter to rotate in a floated manner.

7. A turbine meter as claimed in any one of claims 1 to 6, wherein said guide members of the upstream and downstream sides have a conical and hemispherical shape, respectively.

* * * * *